United States Patent [19]

Manser

[11] Patent Number: 5,425,959
[45] Date of Patent: * Jun. 20, 1995

[54] PROCESS OF AND APPARATUS FOR PRESSING AND DRYING LONG PASTA

[75] Inventor: Josef Manser, Uzwil, Switzerland

[73] Assignee: Buehler AG, Uzwil, Switzerland

[*] Notice: The portion of the term of this patent subsequent to Nov. 15, 2011 has been disclaimed.

[21] Appl. No.: 39,347

[22] PCT Filed: Jul. 27, 1992

[86] PCT No.: PCT/CH92/00154

§ 371 Date: Apr. 20, 1993

§ 102(e) Date: Apr. 20, 1993

[87] PCT Pub. No.: WO93/02561

PCT Pub. Date: Feb. 18, 1993

[30] Foreign Application Priority Data

Jul. 31, 1991 [CH] Switzerland .................. 02292/91

[51] Int. Cl.[6] .................. A23L 1/16; A23P 1/12
[52] U.S. Cl. .................. 426/231; 99/468; 99/474; 99/477; 99/486; 425/301; 425/308; 425/363; 426/451; 426/458; 426/517; 426/518
[58] Field of Search .............. 426/231, 451, 458, 517, 426/518, 557; 425/301, 308, 363; 99/468, 474, 477, 486

[56] References Cited

U.S. PATENT DOCUMENTS 4,126,706 11/1978 Hilton .................. 426/458 X
4,775,542 10/1988 Manser et al. .................. 426/458

FOREIGN PATENT DOCUMENTS 86246 8/1983 European Pat. Off. .
129892 1/1985 European Pat. Off. .
139813 5/1985 European Pat. Off. ............ 426/451
2523282 9/1983 France .................. 426/451
347483 8/1960 Switzerland .
2043424 10/1980 United Kingdom .

*Primary Examiner*—Leo B. Tentoni
*Attorney, Agent, or Firm*—McAulay Fisher Nissen Goldberg & Kiel

[57] ABSTRACT

In a process and apparatus for pressing and drying long pasta, an alternative to hanging is provided wherein the dough strands are first introduced into a drying climate immediately after the goods are discharged from the die. The dough strands are guided directly into the drying means from the extrusion die as long "strings" in a continuous manner and are then cut to packaging length. It is possible for only the initial drying to be operated in this way, particularly to heat up the goods and, e.g., hang them on rods while hot, and then to carry out the final drying in a manner known per se, e.g. by portions. The goods can be dried intensively at previously unaccustomed temperatures of 90° C. to 120° C., particularly during final drying, to a moisture content of 15% to less than 13%. Further, it is preferably suggested to arrange a transverse cutting device for the dough strands directly at the die and a length cutting device for the packaging length subsequent to the drying or after a pre-drying, which allows a particularly great flexibility of the installation for the production of different products, including the shortest types of goods.

36 Claims, 7 Drawing Sheets

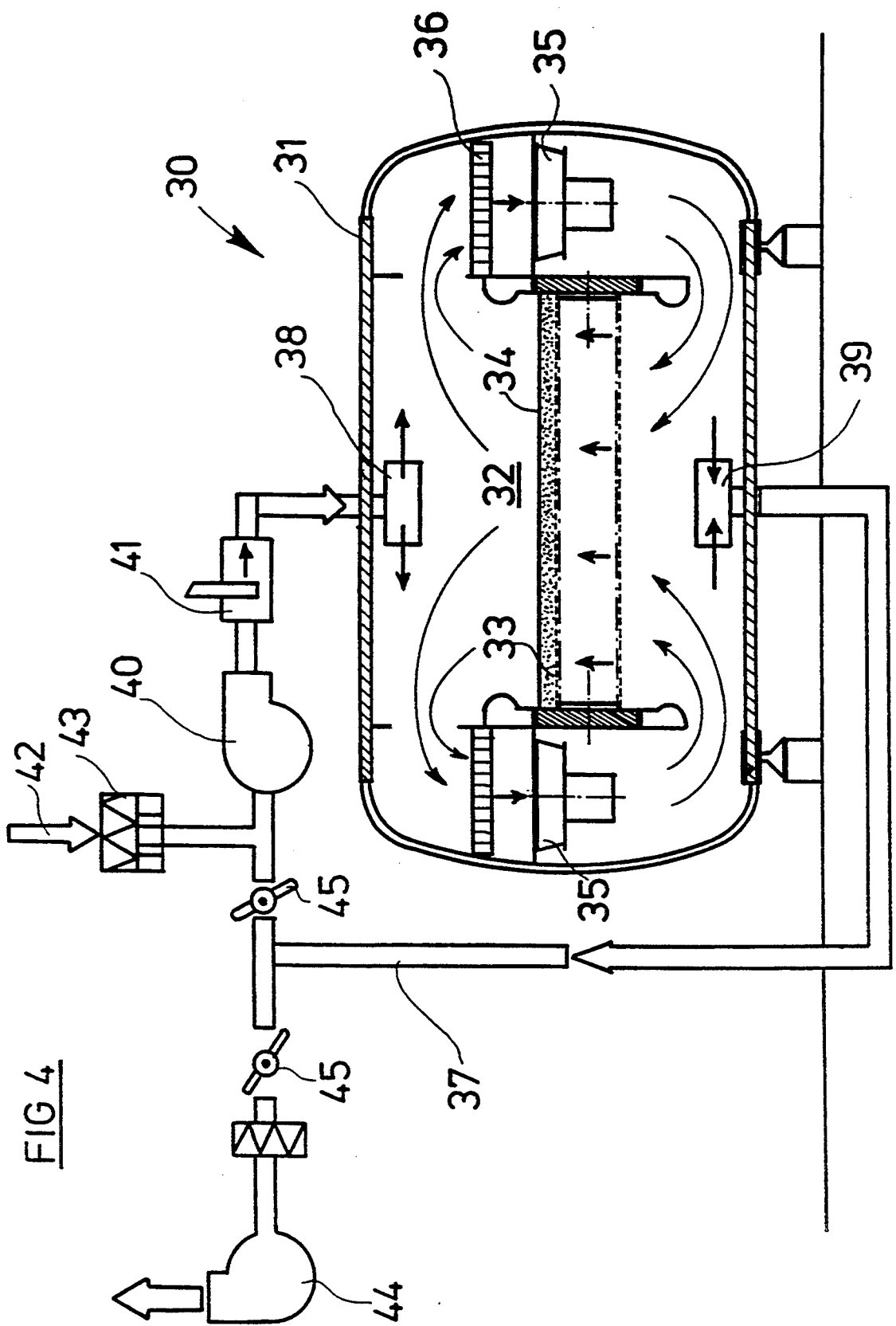

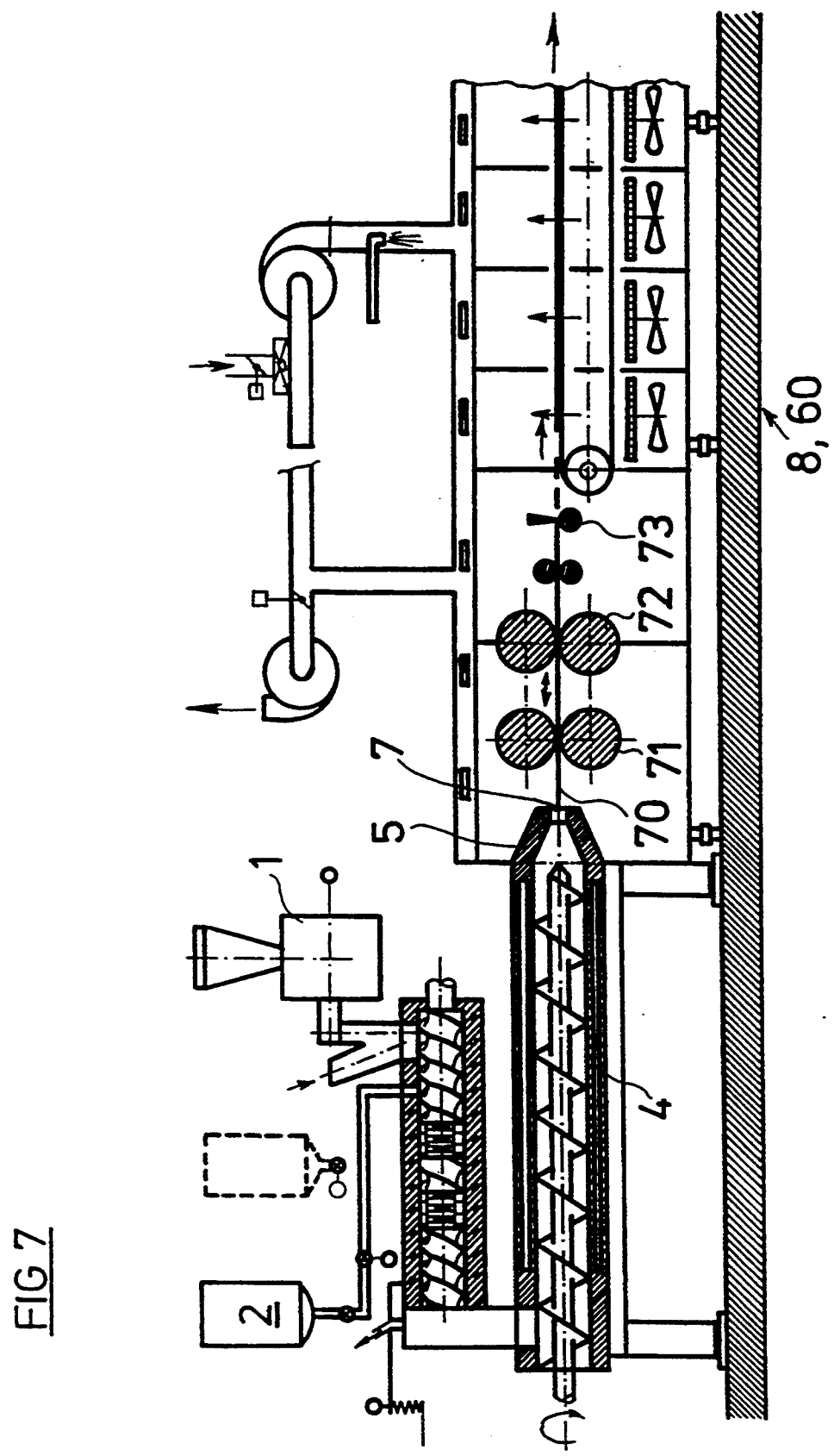

PROCESS OF AND APPARATUS FOR PRESSING AND DRYING LONG PASTA

BACKGROUND OF THE INVENTION a) Field of the Invention

The invention is directed to a process for pressing and drying long pasta (long goods) with a dough moisture content of approximately 28% to 35% during pressing.

b) Background of the Related Art

Dough production is an old Chinese tradition and was brought to the Occident particularly via Italy. Italy possessed ideal climatic conditions for hanging and drying the still moist, flexible strands formed from dough in the fresh air on rods and corresponding frames similar to textiles or washed laundry. In contrast to laundry, which normally dries within a day in such southern climates, pasta requires several days under the same conditions to reach a moisture content of less than 13%. The pasta inevitably acquired a lightly acidic taste caused by an incipient cooking process in the dough.

In a purely physical sense, without regard to the quality of the final product, thin spaghetti can be dried in less than an hour. Nevertheless, until twenty years ago, generally 10 to 20 hours drying time was considered necessary for automated and industrial production. An upper temperature limit for drying of between 60° C. and 70° C., and later 75° C., was likewise considered indispensable. The present Applicant achieved a first major breakthrough with the concept of complete control by a section-by-section drying climate and the simultaneous use of a drying temperature of 80° C. to 100° C. for long goods. It was possible to reduce the drying time to two to six hours. However, all findings confirmed that the drying technique for long goods not only causes more problems, but also requires special general conditions. The technical means must conform to the requirements of the biological, biochemical and physical laws of the product to be processed. The principle goal in the production of pasta is the inner quality of the product, e.g. cooking properties, texture (e.g. al dente) or color, tensile strength, etc. It is also very important to maintain the straightest possible shape of the individual pieces of long goods, not least importantly so as to ensure the smooth functioning of the automatic packaging machinery.

OBJECT AND SUMMARY OF THE INVENTION

The invention has as a primary object the finding a novel solution to enable increased efficiency particularly in drying. A chief object consists in reducing the cost on moving parts and thus enabling a simplification of the plant particularly in hot climate zones.

The solution according to the invention is characterized in that the strands of dough produced via an extrusion die are guided into a drying climate and cut to the desired packaging length in a continuous manner. The dough strands are preferably completely straight until cut and are guided horizontally with drying air being directed vertically at a right angle to the dough strands.

Preliminary tests immediately confirmed that the dough strands have a much greater capacity for maintaining their shape than was previously assumed. Accordingly, with respect to two particular fundamental problems in the production of pasta, namely maintaining the shape and the drying process, it was possible to concentrate more on optimizing the drying process. The advantage of hanging the long goods immediately after they leave the extrusion die consists in that this process can be carried out at low temperatures and in the surrounding atmosphere. Controls and manual intervention can be exercised for preventing disturbances. However, a disadvantage in hanging consists in the waste of space and time for drying and the temperature of the goods is often even reduced before entering the drier. The invention allows a number of particularly advantageous constructions. The dough strands can preferably be guided into a climate which is controlled by control means immediately after the definitive shaping and the temperature of the goods is increased from the pressing temperature to more than 70° C., preferably to more than 80° C. It is suggested in another construction, e.g. for the production of wide noodles, wide lasagna or angular spaghetti, to give the dough strands their definitive shape by means of at least one pair of calibrating or sizing rolls and to dry the pasta as straight strands at a constant strand speed. In this way, so-called "homemade" spaghetti can be produced by using a first sizing roll for producing a sheet of dough and a second sizing roll for forming the spaghetti shape or strand of dough.

For industrial fabrication it is particularly advantageous that the definitive shaping be effected in such a way that a horizontally moved strand is formed which is guided directly into a heating and drying climate. Thus, bending forces can be prevented from acting on the relatively cold, rigid dough strand immediately after extrusion. Accordingly, it is now also possible to provide much longer cut lengths, e.g. when the principle drying is effected on rods, so that the entire drier is shortened and can be conceived in the manner of a tunnel or continuous-flow oven in a single stage.

The goods are preferably cut either into drying lengths or into finished product lengths at a temperature of at least 70° C. and are guided while still hot into a mass drier and dried. This allows the goods to be hung on drying rods in the hot state and for the drying process to be completed on the rods. In so doing, the goods are acted upon by air in a uniform manner on all sides in the pre-drying stage until hung and can be hung on rods, which are also warm, with an even greater stability of shape, but with very great plasticity, or in a warm/plastic state, respectively. The known problems occurring at the hanging site are accordingly eliminated. Since there is no longer any condensation water resulting from the difference in temperature between the rod and the goods, the problem of sticky goods is solved. The risk of breakage due to deformation when hanging in the known U-shape is also reduced.

As an alternative to hanging, it is also possible to carry out the principle drying e.g. in a pocket drier or by portions during packaging or in a part of the packaging process, respectively.

It is further suggested to dry the pre-dried dough strands just to a sufficient stability of shape to less than 8% moisture content, preferably less than 25%, and to cut them while wet. The cut goods are then completely dried, e.g. by portions, to less than 13% product moisture. The length cutting device can move at the speed of the dough strands during cutting. The drying is effected in a large number of drying stages, each stage having its own controllable climate management and its own circulating air system. The initial drying of the dough strands is preferably carried out at a goods temperature of up to 80° C. and the principle drying at a goods temperature of 80° C. to 150° C., preferably 90° C. to 125° C.

According to another construction idea, the dough strands are guided horizontally and the drying air is guided vertically at a right angle to the dough strands. The air speed is preferably high enough so that the dough strands are fluidized. The dough strands are guided via a continuous conveyor, preferably an air-permeable endless conveyor belt or air-permeable vibrating transporting unit.

The invention is further directed to a pasta line for the production of long goods and is characterized in that it has a pasta press and a continuous-flow drier with a continuous-flow conveyor system for dough strands as well as a length cutting machine for hot, pre-dried or dried goods. The continuous-flow drier can be constructed in one or two layers and can have a large number of drying sections with individually controllable climates and circulating air guidance with a turbo system.

It is advantageous that drying consist of alternate heating sections and drying sections and possibly stabilizing sections. The heating of the dough strands can be effected with hot air or by microwave energy with subsequent intensive drying of the dough strands. In an advantageous embodiment form the pasta is stabilized after final drying by microwave.

In another construction, the product temperature is reduced in stages to below 60° C. during the final drying. In so doing, the heat stored in the goods can be utilized for changing the water into steam and accordingly for accelerating the drying process. It is possible to work with a substantially lower drying temperature of the air particularly when microwaves are used for heating the dough strands, since the water in the form of steam can also be guided off easily when heat is guided off. The dough press can include an extrusion die and/or at least one sizing roll with horizontally guided dough strand formation.

It is further suggested that the pasta line have a continuous-strand pre-drier, a hot hanging device, as well as a main rod drier. A cutting device for the first and final cuts of the dough strand is advantageously arranged at the extrusion die or shaping roller.

The invention is further directed to the use of the pasta line, wherein by using the cutting device at the die, but with an increased cutting cadence, the pasta line is used for the production of short goods.

In a particularly advantageous manner, half-moist and moist pasta can be produced as fresh pasta according to the novel invention, e.g. particularly spaghetti, ribbon noodles, and ravioli and tortellini with meat, cheese and vegetable filling, which are sold in stores with a moisture content of 30 to 20%. Maximum storage times and dates for consumption must be indicated on the packaging of such products. In contrast to shelf-dry pasta with an almost unlimited storage time, the fresh or semi-moist pasta only keeps for a limited amount of time because of the high water activity. Due to this high water content, microorganisms can cause the goods to spoil within days under certain conditions. After pressing, the freshly pressed pasta are immediately dried in the form of dough strands in the manner of spaghetti or e.g. co-extruded, filled cannelloni in a drying and pasteurization climate with or without microwaves to temperatures of more than 80° C. so as to be pasteurized, respectively, with a water content from 30% to approximately 20%. The dough strands must then be cooled and packaged under sterile conditions following this drying stage.

Uncooked, fresh and half-moist products which meet legal regulations and microbiological standards can be produced by this process. The processing times lie in the range of 1 to 20 minutes depending on the applied methods. Lower temperatures are necessary for storage and sale to prevent any risk of an unacceptable growth of microorganisms.

For a better understanding of the present invention, reference is made to the following description and accompanying drawings while the scope of the invention will be pointed out in the appended claims.

BRIEF DESCRIPTION OF THE DRAWINGS

FIG. 4 shows the air guidance according to the turbo system;

FIG. 7 shows the use of sizing rolls for forming the dough strand.

DESCRIPTION OF THE PREFERRED EMBODIMENTS

Figure 1:
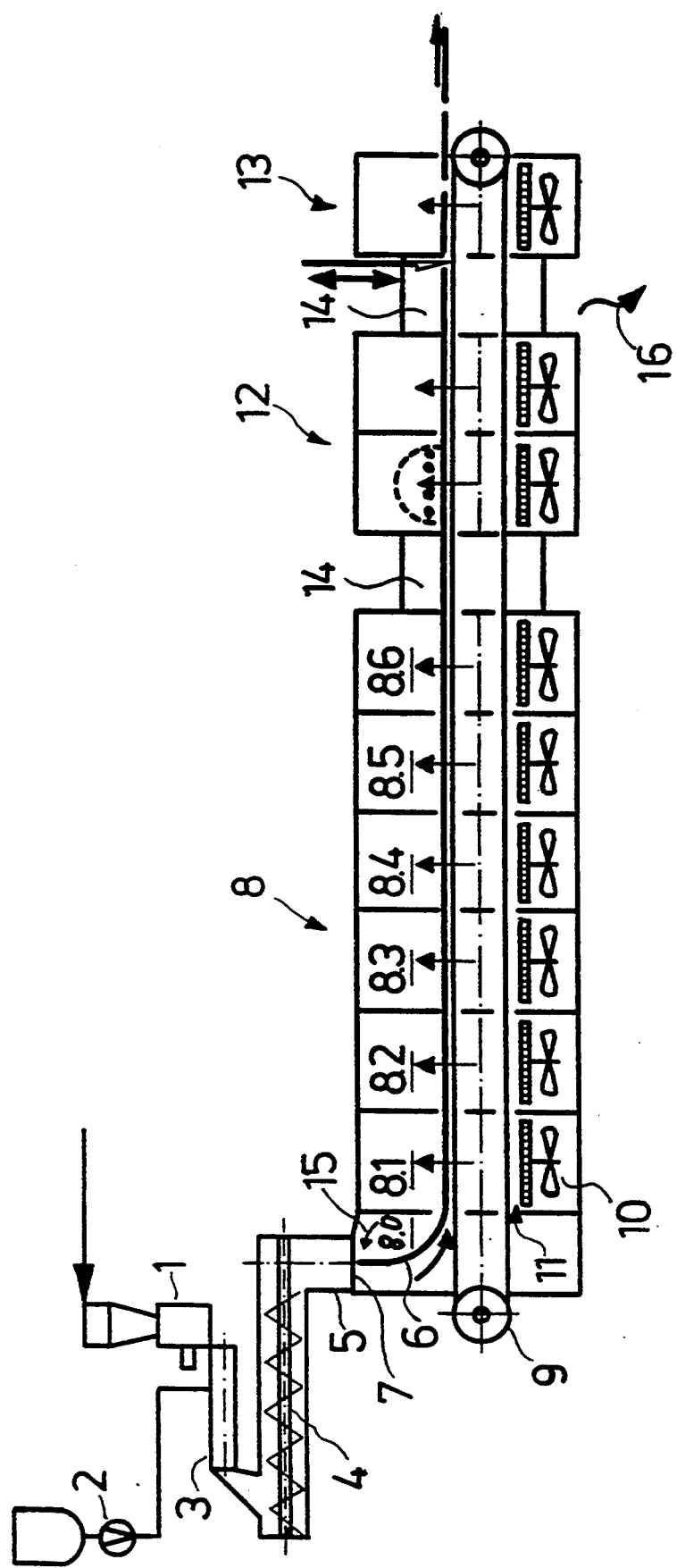
FIG. 1 shows a long goods line completely without rods.

FIG. 1 is referred to in the following. The raw material is fed as dry component via a metering device 1 and as liquid component via a liquid metering device 2 to a kneading device 3 and a pressing screw 4 and a press head 5 from which dough strands 6 are formed by an extrusion die 7 and are guided directly into a drier 8. In the drier 8, an air-permeable conveyor system 9 guides the dough strands continuously through a large number of drying sections 8.0, 8.1, 8.2, etc. Each drying section has its own climate guidance and climate control which is indicated symbolically by a ventilator 10 and a heating element 11. The conveyor system 9 is formed by an endless belt or e.g. a vibrating conveyor by means of which a fluid bed is produced in an advantageous manner, preferably with a slight conveying movement, by a vertical air flow.

A stabilizer 12 is arranged subsequent to the drier 8. A lock 14 is provided between the drier 8 and stabilizer 12 and between the stabilizer 12 and a length cutting device 13. The stabilizer can be constructed as a microwave stabilizer, in which case the two locks 14 are to be constructed as microwave locks. A transverse cutting device for the dough strands, designated by reference number 15 and arrow 15, respectively, cuts incorrectly extruded goods at the start and cuts the dough strands with a uniform end at the end of a batch production. But dough strands of several meters, for example, can also be produced with the transverse cutting device so that strand pieces can be fed to the driers intermittently so that, e.g. in case of large differences in output speed between the individual dough strands, there will only be corresponding disturbances in the initial drying. As indicated by arrow 16, it is also possible for the first time to produce short goods on a long pasta line. The short goods are cut by a die cutting device according to FIGS. 5a and 5b, but can be discharged prior to the length cutting device according to arrow 16.

Figure 2:
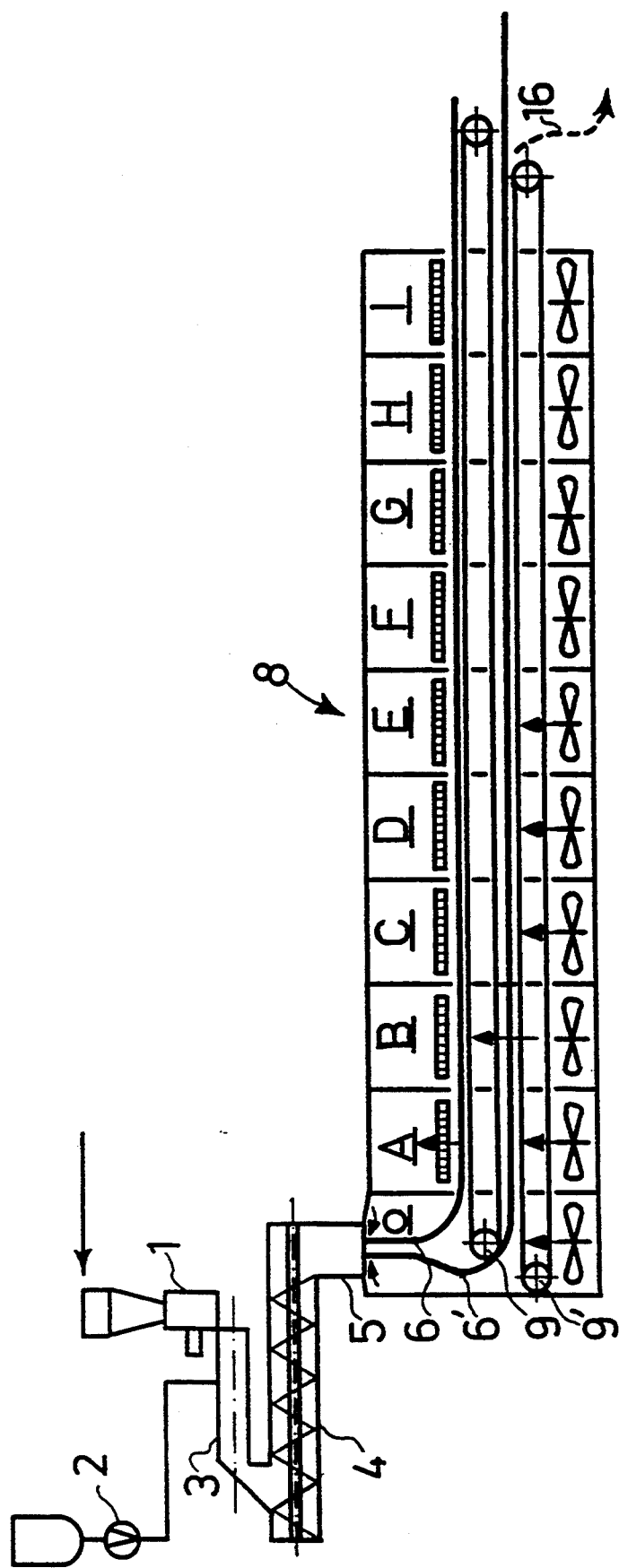
FIG. 2 shows a long goods line with two drying belts arranged one above the other.

FIG. 2 can be viewed as analogous to FIG. 1, but shows a two-tier construction with an upper conveyor system 9 as well as a lower conveyor system 9' on which the dough strands 6 and 6', respectively, are guided through the drier. However, FIG. 2 can also be conceived in such a way that e.g. long goods are produced on the upper belt and short goods are produced on the lower belt so that short or long pasta can be produced on the same line almost without any rearranging.

Figure 3:
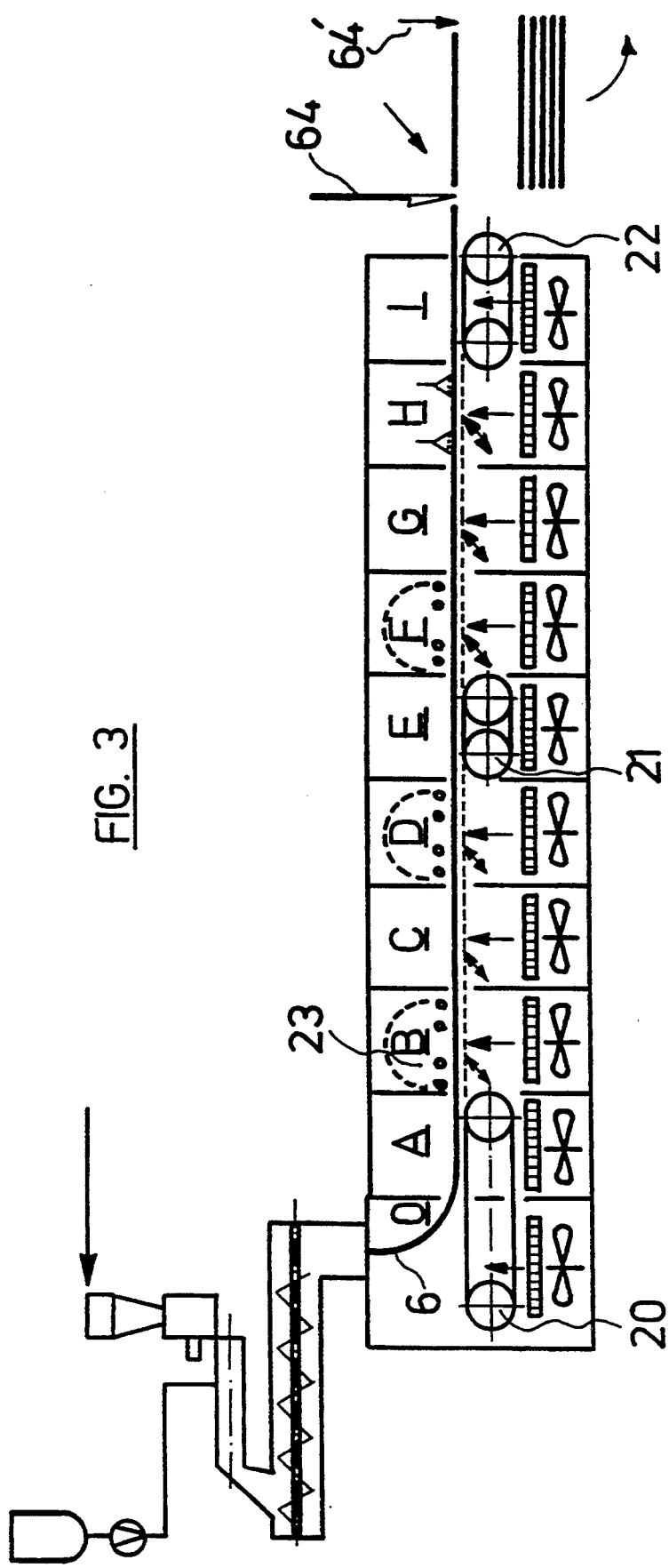
FIG. 3 shows another embodiment example of a long goods line.

FIG. 3 shows a very compact construction of a complete installation with dough preparation and drying of the dough strands. As in FIG. 1, the drier in FIG. 3 is also divided into a large number of individual climate zones O, A, B, C, D, etc. A microwave heating stage 23 is provided in the climate zones B, D and F. Product intake means, e.g. in the form of a conveyor belt 20, product discharge means 22, and a directing belt 21 are provided in the central region. The product discharge belt exerts a slight tension on the strands. In all variants a large number of dough strands are guided through the installation in a carpet-like manner along the entire width of 1 to 2.5 m. A plurality of dough strands can also lie on top of one another on the same conveyor system when there is a sufficient through-flow of air. The conveying units advantageously have longitudinal guide ribs which steer the dough strands in the longitudinal direction.

The drying air is guided in circulating air operation with a turbo system which makes it possible to blow previously prepared air and air mixtures into the drier, as is shown in FIG. 4 in a schematic cross section. A drying element 30 which is sheathed externally with insulation 31 and can correspond e.g. to a climate zone O, A, B, C, etc., is the actual processing space 32 in which goods 33 are moved forward on the conveyor system 9 constructed as a belt conveyor or vertically relative to the drawing plane. An internal air system is formed by ventilators 35 arranged at both sides, heating elements 36 being associated with the latter. The internal air system provides for a uniform distribution of air in the entire space for the goods to be dried and has control means for adjusting the desired climate.

Strong vibrations can also be transmitted to the air to intensify the drying process. An external air system 37 is also provided in addition for a quick and economical influencing of the climate in the processing space 32, which external air system 37 regulates the desired climate via longitudinal ducts, a blow-in duct 38, and an exhaust duct 39 by a correspondingly controlled exchange of air. The external air system has a ventilator 40, a humidifying unit 41, a fresh air intake 42 with air heater 43, and an exhaust ventilator 44. The amount of air can be adapted as required via controllable adjusting flaps 45. The individual climates can be regulated in a formula-controlled manner and with the aid of corresponding temperature and moisture sensors.

Figure 5A:
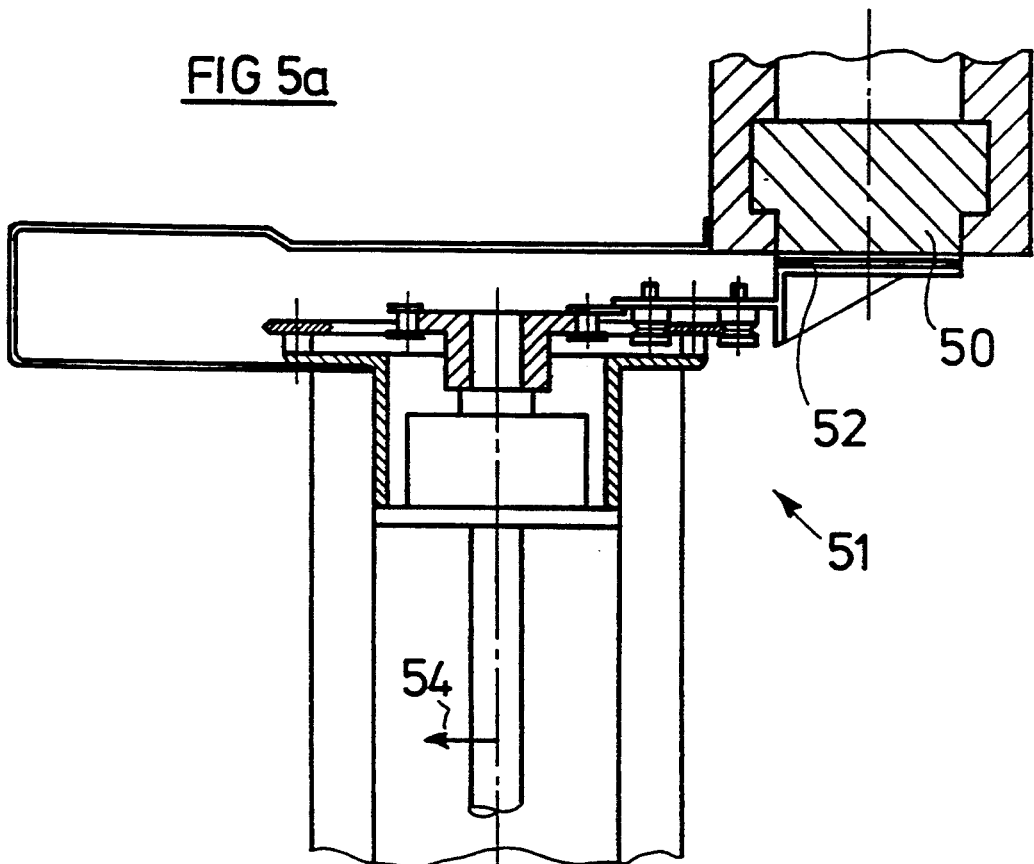
FIGS. 5a and 5b show a die cutting device directly at the long die, 5b showing a plan view and 5a a section V—V of FIG. 5b.
Figure 5B:
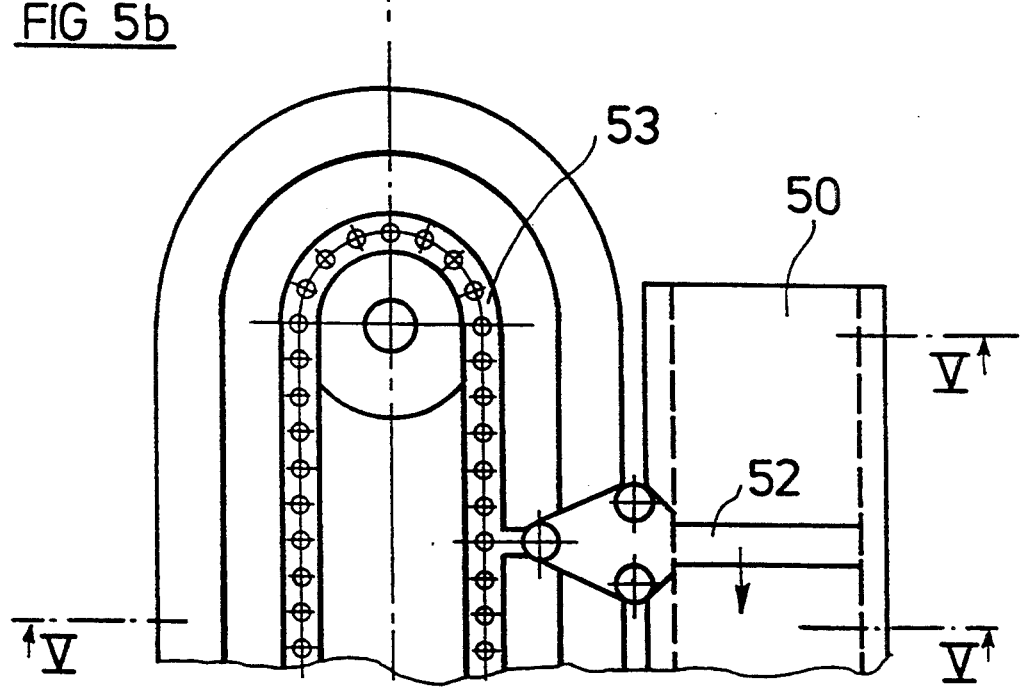

FIGS. 5a and 5b show a long die 50 with adjoining die cutting device 51 which is constructed as a length cutting device and has one or two rotating cutting knives 52. The cutting knives 52 are guided at an endless chain 53. The goods exiting from the long die can be cut in appropriate lengths in a straight-line movement along the long die (as length cutting device) corresponding to the rotating speed of the cutting knives 52 and the discharge speed of the shaped goods. The die cutting device remains in the moved back position for the production of dough strands and is only actuated for a first and last cut.

Figure 6:
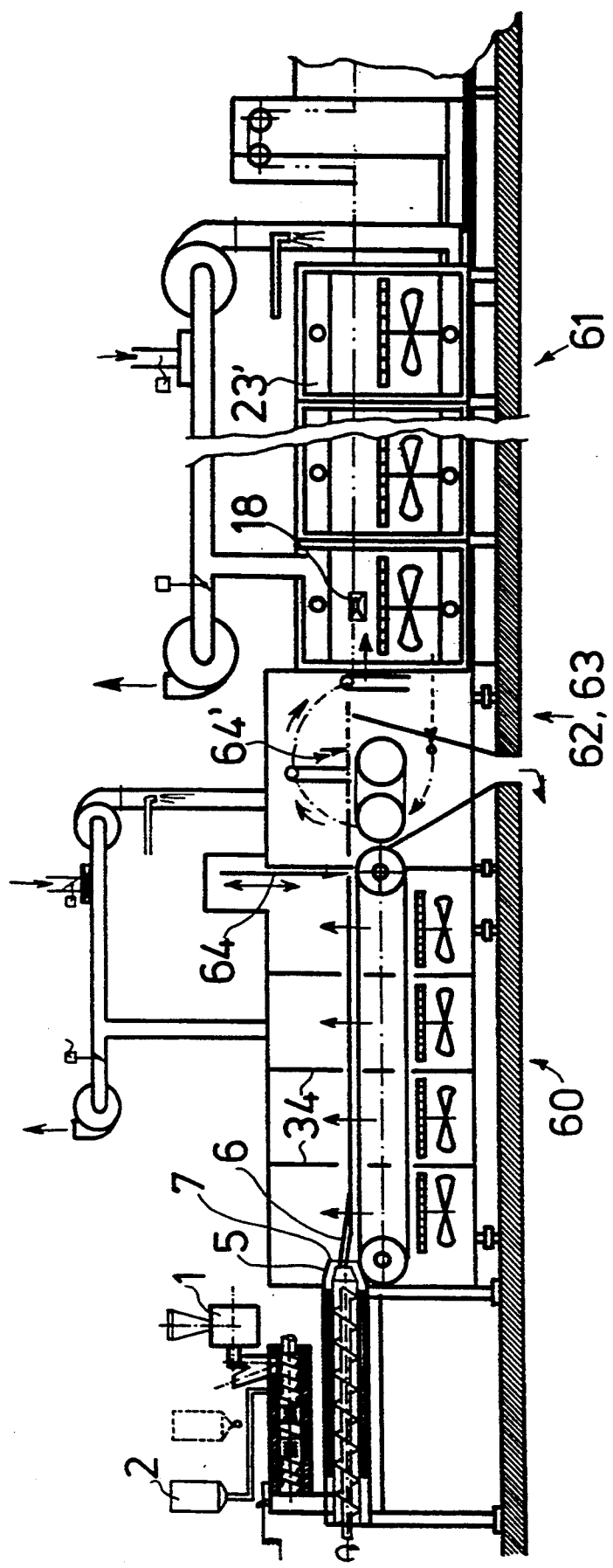
FIG. 6 shows strand pre-drying with principle drying on rods.

FIG. 6 shows the combination of dough strand formation for the pre-drying 60 as well as a main drier 61 which is constructed as a rod drier. A hanging device 62 in which the hot goods are cut into drying lengths is located between the dough strand drier 60 and the main drier.

The drying lengths can be hung on rods in the shape of a U, in a manner known per se, via a circular rod hanger 63. A controlled length cutting device 64 can produce exact lengths, possibly as a double cut, with an additional knife 64'. In FIG. 6, the pressing screw is constructed with horizontal die outlet so that the dough strand runs substantially in an unchanging horizontal movement direction from the die outlet directly into the pre-drier 60. The portions produced in the length cutting device 64 can be reduced and returned to the dough preparation since they still have a high moisture content.

The solution according to FIG. 7 can be constructed in a manner analogous to FIG. 6 or e.g. FIG. 1. However, it has a special die which produces a dough ribbon extending along the entire drier 8 and 60, respectively. The dough ribbon is rolled to an exact thickness in a first thickness sizing roll 71. The desired shape of the goods, e.g. wide noodles, lasagna or angular spaghetti, is then extruded in a continuous manner in a shaping roller 72. Depending on the desired shape of the final product, any desired goods length or strand length can be produced in this way, in addition, via a length cutting device 73.

What is claimed is:

1. In a process for pressing and drying long pasta with a dough moisture content at the emergence of their form during pressing of approximately 28% to 35%, the long pasta being produced as dough strands which are guided, as goods, up to final drying through different climate zones and, at the end of the drying process, cooled, the improvement comprising the steps of: producing dough strands by an extrusion die and guiding the dough strands, in a horizontal position, continuously into a drying climate, drying said dough strands and, at least at a predetermined position relative to the drying process, cutting them.

2. The process according to claim 1, wherein the predetermined position is arranged after at least a drying step.

3. The process according to claim 1, wherein the dough strands, as goods, are guided into a climate which is controlled by control means immediately after definitive shaping and the temperature of the goods is increased from pressing temperature to more than 70° C.

4. The process according to claim 1 wherein the dough strands are definitively shaped by a pair of sizing rolls and dried as straight strands at a constant strand speed.

5. The process according to claim 1, wherein the goods are cut as hot strands after pre-drying at a temperature of at least 70° C. into drying lengths and are dried in a warm state in a mass drying process.

6. The process according to claim 1, wherein the goods are hung and dried in a hot state on drying rods.

7. The process according to claim 1, wherein the dough strands are dried just to a sufficient stability of shape to less than 28% moisture content, and cut while wet, and the cut goods are the completely dried, by portions, to less than 13% product moisture.

8. The process according to claim 7, wherein a length cutting device is moved at the speed of the dough strands during the cut.

9. The process according to claim 1, wherein the drying is effected in a large number of drying stages, each stage having its own controllable climate management and its own circulating air system, and initial drying of the dough strands is carried out at a goods temperature of up to 80° C. and principal drying at a goods temperature of 80° C. to 150° C.

10. The process according to claim 1, wherein the dough strands are guided horizontally and the drying air is guided vertically at a right angle to the dough strands, the air being pulsated to intensify the drying process, and the air speed is controllable so that the dough strands are fluidized, the dough strands being guided by continuous conveyor means.

11. In a pasta line for the production of long goods, comprising a pasta press and a continuous-flow drier having divided stages with a continuous-flow conveyor system for horizontally guiding dough strands and a length cutting device which is arranged at a predetermined position.

12. In a pasta line according to claim 11, wherein the continuous-flow drier is constructed in one or more layers and has a large number of drying sections with individually controllable climates and a circulating air guidance with turbo system.

13. The pasta line according to claim 11, wherein the dough press has an extrusion die with horizontally guided dough strand formation.

14. The pasta line according to claim 11, including a continuous-strand pre-drier, a transverse cutting device, a hot hanging device, and a main rod drier.

15. In a pasta line for the production of long goods having a die, means for guiding dough strands, as goods, from the die, means for drying the goods and means for cooling the goods, the improvement comprising:
that said guiding means guides the dough strands in a horizontal position through said drying means, said drying means being a continuous-flow dryer; and
a transverse cutting device at the die and a length cutting device for hanging hot goods.

16. A method of using a pasta line having a die, means for guiding dough strands, as goods, from the die, means for drying the goods and means for cooling the goods, wherein the guiding means guides the dough strands in a horizontal position through the drying means, the drying means being a continuous-flow dryer and wherein a transverse cutting device is provided at the die and a length cutting device is provided for hanging hot goods, said method including a step of using said transverse cutting device at the die with a cutting cadence which will produce short goods.

17. The method of claim 1 wherein the predetermined position is arranged directly before an entrance of the drying step.

18. The method of claim 17 wherein the predetermined position is arranged directly following the pasta press.

19. The method of claim 2 wherein the predetermined position is arranged before an entrance of the drying step.

20. The method of claim 1 wherein the predetermined position is arranged at an outlet of drying climates.

21. The method of claim 1 wherein the predetermined position is arranged both before an entrance of and after an outlet of the drying step.

22. The pasta line of claim 11 wherein the predetermined position is arranged after a pre-drying step.

23. The pasta line of claim 11 wherein the predetermined position is arranged before the continuous flow dryer.

24. The pasta line of claim 11 wherein the predetermined position is arranged directly following the pasta press.

25. The pasta line of claim 11 wherein the predetermined position is arranged at the end of the continuous flow dryer.

26. The pasta line of claim 11 wherein the predetermined position is arranged both before and after the continuous flow dryer.

27. The process of claim 3 wherein the temperature of the goods is increased from pressing temperature to more than 80° C.

28. The process of claim 7 wherein the dough strands are dried just to a sufficient stability of shape to less than 25% moisture content.

29. The process of claim 9 wherein the principal drying takes place at a goods temperature of 90° C. to 125° C.

30. The process of claim 10 wherein the continuous conveyor means includes an air permeable endless conveyor belt.

31. The process of claim 10 wherein the continuous conveyor means includes an air-permeable vibrating transport unit.

32. The pasta line of claim 11 wherein the dough press has a sizing roll with horizontally guided dough formation.

33. The pasta line of claim 12 wherein the dough press has a sizing roll with horizontally guided dough formation.

34. The process of claim 5 wherein the goods are cut into finished product lengths and are dried in a warm state in a mass drying process.

35. The process of claim 1 wherein the goods are cut as hot strands after predrying at a temperature of at least 70° C. into drying lengths and guided into a main drier.

36. The process of claim 1 wherein the goods are cut as hot strands after predrying at a temperature of at least 70° C. into finished product lengths and guided into a main dryer.

* * * * *